US009933953B1

(12) United States Patent
Taylor et al.

(10) Patent No.: US 9,933,953 B1
(45) Date of Patent: Apr. 3, 2018

(54) MANAGING COPY SESSIONS IN A DATA STORAGE SYSTEM TO CONTROL RESOURCE CONSUMPTION

(71) Applicant: EMC Corporation, Hopkinton, MA (US)

(72) Inventors: Alan L. Taylor, Cary, NC (US); Paul T. McGrath, Raleigh, NC (US); David Haase, Fuquay Varina, NC (US); Michael C. Brundage, Cary, NC (US); Somnath A. Gulve, Morrisville, NC (US); Michael Paul Wagner, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/198,138

(22) Filed: Jun. 30, 2016

(51) Int. Cl.
*G06F 12/00* (2006.01)
*G06F 3/06* (2006.01)
*G06F 12/02* (2006.01)
*G06F 13/00* (2006.01)
*G06F 13/28* (2006.01)

(52) U.S. Cl.
CPC .......... *G06F 3/0611* (2013.01); *G06F 3/065* (2013.01); *G06F 3/067* (2013.01); *G06F 3/0659* (2013.01); *G06F 12/0253* (2013.01); *G06F 2212/1016* (2013.01); *G06F 2212/154* (2013.01); *G06F 2212/263* (2013.01)

(58) Field of Classification Search
CPC ...... G06F 3/0611; G06F 3/065; G06F 3/0659; G06F 3/067; G06F 2212/1016; G06F 2212/154; G06F 2212/263
See application file for complete search history.

(56) References Cited

U.S. PATENT DOCUMENTS

| 5,241,668 | A | * | 8/1993 | Eastridge | G06F 11/1461 |
| | | | | | 707/999.202 |
| 5,913,029 | A | * | 6/1999 | Shostak | G06F 17/30572 |
| | | | | | 707/999.201 |
| 6,539,462 | B1 | * | 3/2003 | Mikkelsen | G06F 11/2074 |
| | | | | | 707/999.202 |
| 6,704,836 | B1 | * | 3/2004 | Griswold, Jr. | G06F 3/0617 |
| | | | | | 711/111 |
| 7,949,882 | B2 | * | 5/2011 | Miyawaki | G06F 3/061 |
| | | | | | 705/50 |

(Continued)

OTHER PUBLICATIONS

EMC MirrorView Knowledgebook, A Detailed Review, Mar. 2015, pp. 1-88, Releases 30-33.

*Primary Examiner* — Mark A Giardino, Jr.
(74) *Attorney, Agent, or Firm* — BainwoodHuang (57) ABSTRACT

A technique for managing copy sessions in a data storage system supports active and inactive copy-session states and reclaims memory for inactive copy sessions to reduce their memory footprints. When a copy session transitions from the active state to the inactive state, the copy session persists certain copy-progress data in non-volatile storage and frees structures in memory previously storing that copy-progress data. The inactive copy session continues to run but performs no copying and consumes less memory. When the copy session later transitions back to the active state, the copy session reads the copy-progress data back into memory and resumes copying.

17 Claims, 5 Drawing Sheets

(56) References Cited

U.S. PATENT DOCUMENTS

| | | | |
|---|---|---|---|
| 2009/0292888 A1* | 11/2009 | Srivastava | G06F 11/1464 |
| | | | 711/162 |
| 2010/0058014 A1* | 3/2010 | Satou | G06F 3/062 |
| | | | 711/162 |
| 2014/0281306 A1 | 9/2014 | Nakajima et al. | |
| 2015/0052268 A1* | 2/2015 | Brown | G06F 3/0656 |
| | | | 710/23 |
| 2017/0199814 A1* | 7/2017 | Molloy | G06F 12/0638 |

* cited by examiner

MANAGING COPY SESSIONS IN A DATA STORAGE SYSTEM TO CONTROL RESOURCE CONSUMPTION

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

A common function of data storage systems is to copy data from a source to a destination. The purpose of such copying may be to create a clone (i.e., a complete data copy) of a data object or to migrate a data object, e.g., from one storage pool to another.

A data storage system may store many data objects, and a storage processor in the data storage system may have multiple copies in progress at any given time. The storage processor may perform each copy in a respective copy session. The storage processor may start each copy session, copy the identified data, and end the copy session once copying is complete.

SUMMARY

As numbers of data objects that run on a data storage system have increased, so too has the number of copy sessions that may run concurrently. Unfortunately, computing resources on storage processors cannot always keep pace with increased numbers of copy sessions, with available memory being a particular limiting factor. As a storage processor runs more and more copy sessions, less and less memory remains available for servicing hosts. As a result, there may come a point at which adding copy sessions impairs the ability of the data storage system to meet response-time guarantees for reads and writes from hosts.

In contrast with the above-described prior approach, which does not scale efficiently as the number of copy sessions increases, an improved technique for managing copy sessions in a data storage system supports active and inactive copy-session states and reclaims memory for inactive copy sessions to reduce their memory footprints. When a copy session transitions from the active state to the inactive state, the copy session persists certain copy-progress data in non-volatile storage and frees structures in memory previously storing that copy-progress data. The inactive copy session continues to run but performs no copying and consumes less memory. When the copy session later transitions back to the active state, the copy session reads the copy-progress data back into memory and resumes copying.

In some examples, the data storage system cycles through different copy sessions over time while limiting a maximum number of copy sessions that run in the active state at any given time. The data storage system thus allows a large number of copy sessions to run concurrently while controlling the amount of memory that such copy sessions consume.

In some examples, the data storage system persists data related to copy sessions in multiple persistent data structures. A first data structure stores session identifiers of all running copy sessions. A second data structure stores core properties of all sessions identified in the first data structure, including an indicator as to whether each respective session is active or inactive. A third data structure stores properties that may be brought in and out of memory when the respective sessions transition between active and inactive states. Providing persistent data structures in this manner promotes efficient recovery from storage processor crashes and reboots, as it enables access to be limited only to data needed to recover the copy sessions that were running when the crash or reboot occurred. It also avoids having to restore properties from the third data structure for sessions that were inactive when the crash or reboot occurred.

Certain embodiments are directed to a method of managing copy sessions in a data storage system. The method includes running multiple copy sessions concurrently in the data storage system, each copy session configured to copy data from a respective source in the data storage system to a respective destination in the data storage system. The method further includes directing a first of the multiple copy sessions to assume an inactive state by (i) suspending copying of data from a first source to a first destination, (ii) writing a set of copy-progress data residing in a portion of volatile memory to non-volatile storage, and (iii) freeing the portion of volatile memory. The method still further includes directing the first copy session, running in the inactive state, to assume an active state by (i) loading the set of copy-progress data from the non-volatile storage into volatile memory and (ii) resuming copying of data from the first source to the first destination. The first copy session has a larger volatile memory footprint in the active state than in the inactive state.

Other embodiments are directed to a data storage system constructed and arranged to perform a method of managing copy sessions, such as the method described above. Still other embodiments are directed to a computer program product. The computer program product stores instructions which, when executed on control circuitry of a data storage system, cause the data storage system to perform a method of managing copy sessions, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing copy sessions in a data storage system supports active and inactive copy-session states and reclaims memory for inactive copy sessions to reduce their memory footprints.

Figure 1:
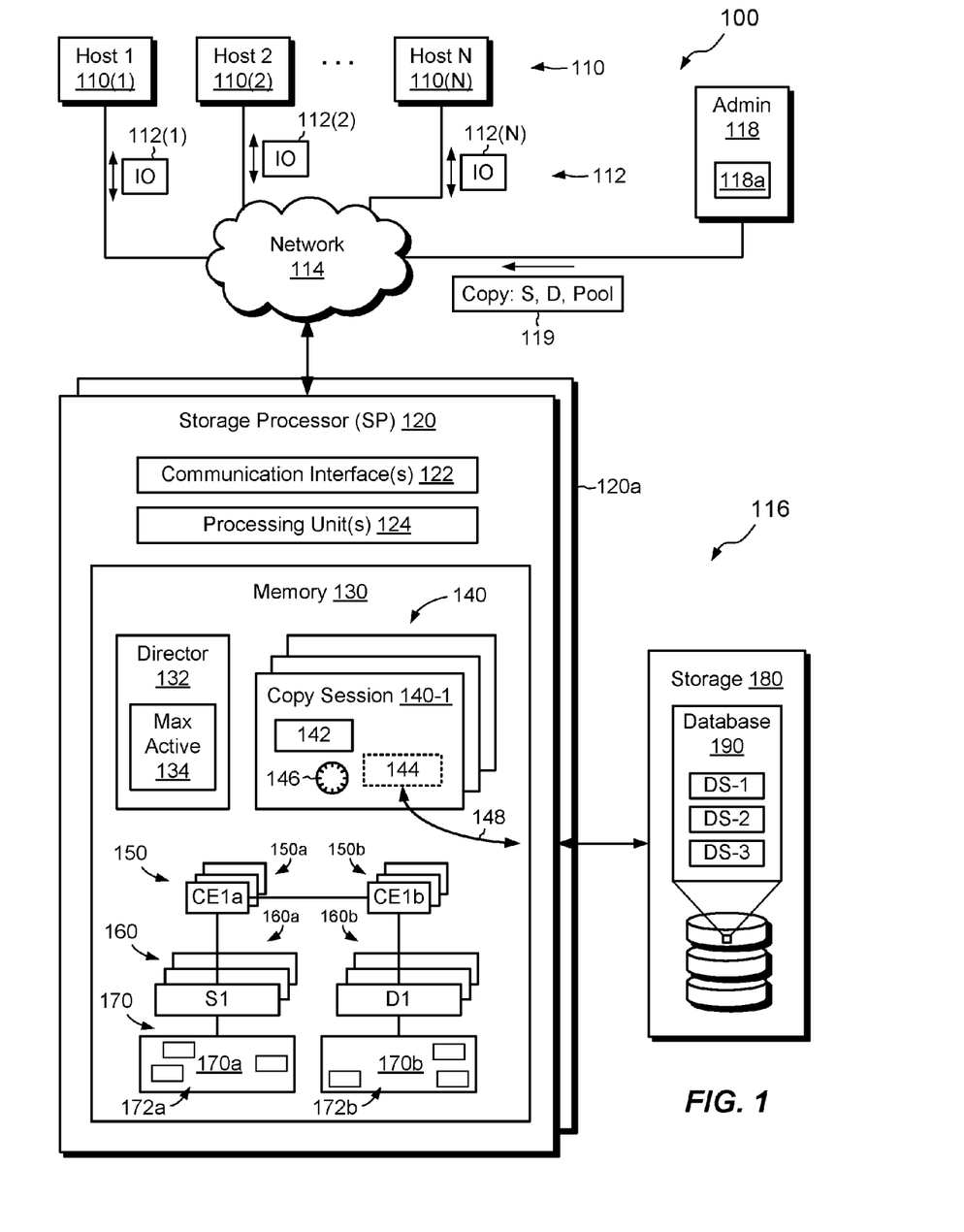
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110(1) through 110(N) and an administrative machine 118 access a data storage system 116 over a network 114. The data storage system 116 includes a storage processor, or "SP," 120 and storage 180, such as magnetic disk drives, electronic flash drives, and the like. The storage 180 is configured to store both host data and a database 190. In an example, database 190 persistently stores information related to the operation and management of the data storage system 116.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It should be understood, however, that no particular hardware configuration is required, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. Hosts 110 may connect to the SP 120 using various technologies, such as Fibre Channel, iSCSI, NFS, SMB 3.0, and CIFS, for example. Any number of hosts 110 may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112 (e.g. 112(1-N)) according to block-based and/or file-based protocols and to respond to such IO requests 112 by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs, as well as associated chipsets and coprocessors. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," e.g., realizes by execution of software instructions, a director 132, copy sessions 140, copy engines 150, data objects 160, and storage pools 170. The storage pools 170 include storage extents created from disk drives in the storage 180. For example, pool 170a includes extents 172a, which may be derived from magnetic disk drives in storage 180. Similarly, pool 170b includes extents 172b, which may be derived from solid state drives in the storage 180. The data storage system 116 is configured to build data objects 160 upon respective pools. For example, the data storage system 116 builds data objects 160a upon pool 170a and composes the data objects 160a from storage extents 172a. As a result of operating copy sessions 140, the data storage system 116 creates data objects 160b as copies of data objects 160a, with data objects 160b built upon pool 170b and composed from storage extents 172b.

In example operation, the hosts 110 issue IO requests 112 to the data storage system 116. The SP 120 receives the IO requests 112 at the communication interfaces 122 and initiates further processing. Such processing may include executing instructions for reading and writing the data objects 160a.

Asynchronously with the receipt of IO requests 112 from hosts 110, an administrator of administrative machine 118 operates a program 118a to initiate one or more copy sessions 140. For example, the program 118a sends a copy request 119 that identifies (i) a source object to be copied, (ii) a destination object to be created, and (iii) a destination pool on which the destination object is to be created. For simplicity, it is assumed in this example that the copy sessions 140 specify data objects 160a as sources, specify data objects 160b as destinations, and specify pool 170b as the destination pool in each case. However, copy sessions may specify sources and destinations in either pool 170. In some examples, the source and destination objects may reside in the same pool 170. Also, the data storage system 116 may include any number of pools 170. In the manner described, the administrator may specify any number of copy sessions, such as hundreds or even thousands. Although this example involves a human administrator that specifies copy sessions 140, such sessions may alternatively be initiated by a software program or other construct without direct human involvement.

In the particular example shown in FIG. 1, the data storage system 116 may receive a request 119 to create a new copy session. The request specifies source S1, destination D1, and pool 170b. In response to the request 119, the SP 120 creates a new session 140-1 in memory 130, e.g., as an executable object, procedure, thread, or set of threads. SP 120 generates a new copy-session ID (SID) for session 140-1 (i.e., a unique identifier of copy session 140-1 in the data storage system 116). SP 120 also allocates volatile memory space 142 in session 140-1 for storing core properties of the copy session 140-1. For example, the copy session 140-1 declares variables, instantiates objects, or otherwise obtains memory space 142. The core properties stored in memory space 142 include, for example, the identity of the source (S1), the identity of the destination (D1), and a state of the copy session 140-1, i.e., whether the copy session 140-1 is active or inactive.

In an example, the SP 120 creates a container for the destination object D1 in pool 170b and inserts copy engines CE1a and CE1b into the IO paths of objects S1 and D1. These copy engines CE1a and CE1b are configured to perform fast copying from S1 to D1 and to provide copy progress information for session 140-1. SP 120 allocates volatile memory portion 144 in copy-session 140-1 for storing such copy-progress information, e.g., in declared variables, classes, etc. Copy-progress information may include, for example, counters, progress indicators, bitmaps, and the like, which reflect a detailed current status of data copying activities from S1 to D1.

To provide swap space and to enable recovery in cases of data corruption, power failures, and the like, SP 120 may persist session information in database 190. The database 190 may include data structures DS-1, DS-2, and DS-3. In an example, SP 120 persists the SID of session 140-1 in DS-1, e.g., along with SIDs of other running copy sessions 140. SP 120 also persists core properties of session 140-1 in DS-2, e.g., along with core properties of other running copy sessions 140. SP 120 further persists copy-progress data in DS-3, e.g., along with copy-progress data of other sessions 140. It should thus be appreciated that data structure DS-2 persists core properties held in volatile memory space 142 and that data structure DS-3 persists copy-progress data held in volatile memory portion 144.

With the copy session 140-1 running, the copy engines CE1a and CE1b may begin copying the data of S1 to D1. As copying proceeds, the copy engines CE1a and CE1b update the copy-progress information in memory portion 144. To keep data stored persistently in DS-3 approximately current with data accumulating in memory portion 144, copy session 140-1 flushes the copy-progress information from memory portion 144 to DS-3. Such flushing 148 may be performed in accordance with a schedule 146, which may be time-based (e.g., every 5 minutes, every hour, etc.), based on how much copy progress has changed since the last flushing 148, or based on a combination of these factors.

The data storage system 116 may run many copy sessions 140 at a time, and the demands on memory 130 may become great. If left unregulated, copy sessions 140 can consume so much memory 130 as to impair real-time functions of the data storage system 116, such as its ability to service IO requests 112 at guaranteed speeds. To avoid this undesirable outcome, director 132 selectively places some of the copy sessions 140 in an inactive state and frees some of their consumed memory, making such memory available for more critical real-time activities.

For example, director 132 instructs copy session 140-1 to assume the inactive state. In response, copy session 140-1 directs copy engines CE1a and CE1b to stop active copying. Copy session 140-1 updates persistent storage in DS-2 to reflect the change in its core properties from active to inactive. It further flushes copy-progress data to DS-3. Once copy-progress data has been persisted, the copy session 140-1 frees memory portion 144. For example, session 140-1 may destroy any software objects storing copy-progress data, set pointers to null, and so forth. As memory portion 144 may have occupied a large memory footprint, freeing memory portion 144 significantly reduces the total memory footprint of copy session 140-1. When placed in the inactive state, copy session 140-1 continues to run, albeit in a state of reduced functionality. For example, copy session 140-1 may continue to respond to polling, e.g., informational requests from the administrative program 118a, but it cannot perform active copying.

At some later point, director 132 may instruct copy session 140-1 to resume the active state. In response, copy session 140-1 recreates software objects (e.g., variables, classes, etc.), retrieves previously-persisted copy-progress data from DS-3, and populates the newly recreated software objects with the retrieved data. Although the memory used by the new objects is not necessarily the identical memory cells that formed memory portion 144, the new objects consume approximately the same amount of space as that described in connection with memory portion 144. The session 140-1 may then pick up copying where it left off, with copy engines CE1a and CE1b performing physical copying and keeping copy-progress data current.

In an example, the director 132 selectively instructs copy sessions 140 to become active and inactive over time so as to keep the number of active sessions within a predetermined limit 134. For example, the director 132 may arrange sessions 140 in groups and allow only a single group to be active at a time, while the rest are inactive. The number of sessions in each group may be set to the limit 134. The director 132 may cycle through the groups, giving each group time to run in the active state, before advancing to the next group. In this manner, the data storage system 116 regulates the amount of memory 130 consumed by copy sessions 140 and ensures that the copy sessions 140 do not impair real-time operations. Such regulation is achieved, however, without completely disabling inactive copy sessions, as they continue to run and are able to respond to polling from administrative program 118a.

Figure 2:
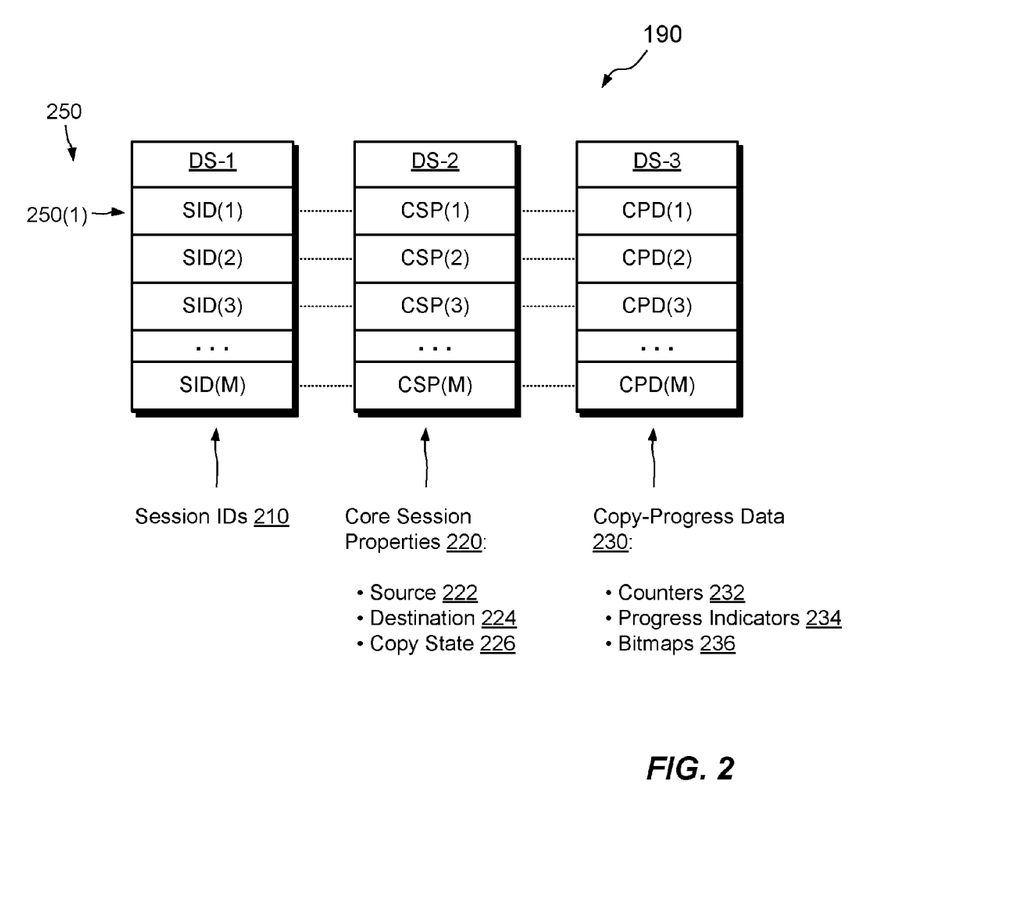
FIG. 2 is a block diagram of example data structures for storing copy-session information.

FIG. 2 shows example data structures DS-1, DS-2, and DS-3 in greater detail. As shown, DS-1 includes session IDs (SIDs) 210 (i.e., SID(1) through SID(M)), i.e., one SID for each running copy session 140, of which there is a total of "M."

DS-2 includes core session properties 220 (CSP(1) through CSP(M)), i.e., one set of core properties for each running copy session 140. Each set of core properties 220 may include, for example, a source identifier 222, a destination identifier 224, and a copy state 226, i.e., "active" or "inactive."

DS-3 includes copy-progress data 230 (CPD(1) through CPD(M)), i.e., one set of copy-progress data (if it exists) for each running copy session 140. Each set of copy session data may include, for example, counters 232, progress indicators 234, bitmaps 236, and the like, and reflects the copy progress data that was stored in memory portion 144 the last time flushing 148 took place.

In an example, each of the data structures DS-1, DS-2, and DS-3 arranges its data in records, with each record having a position or index 250 in the respective data structure. In an example, information about the same copy sessions are stored at the same indices across the three data structures. For example, if the session ID SID(1) for a first copy session is stored at index 250(1) of DS-1, then the set of core session properties CSP(1) for that same copy session will be stored at index 250(1) of DS-2. Likewise, the copy-progress data CPD(1) for that same copy session will be stored at index 250(1) of DS-3.

In an example, the records in DS-1 store information about running copy sessions only. For example, copy sessions that previously ran and completed are not listed. Each copy session listed in DS-1 is thus running and is either active or inactive.

Although data structures DS-1, DS-2, and DS-3 appear in the form of tables, this is merely an example, as the data structures may take any suitable form. In some examples, a separate software layer may provide access to the information in the data structures DS-1, DS-2, and DS-3 and may express such data in the format shown, or in any other suitable format, even though the information may be stored on disk in another format.

Figure 3:
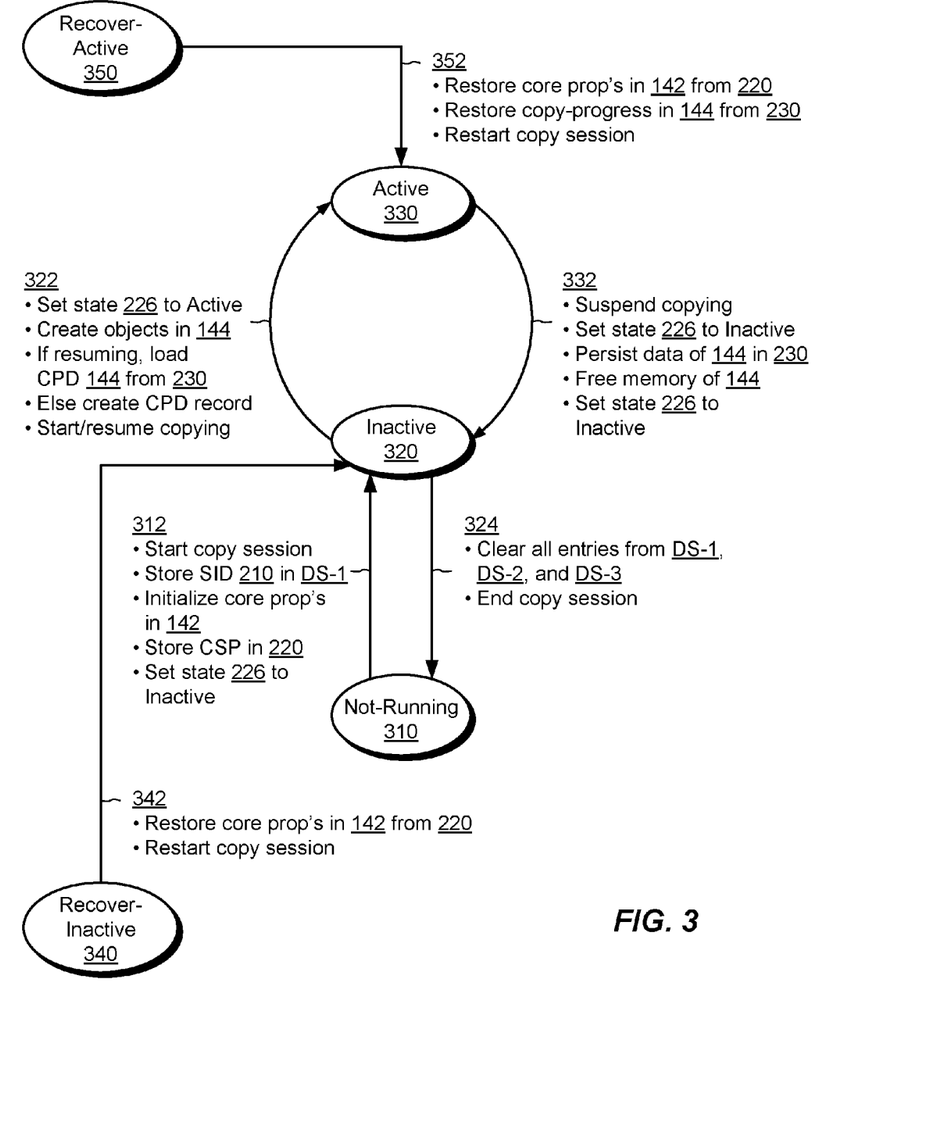
FIG. 3 is a diagram showing example states and state transitions of a copy session.

FIG. 3 shows example states and state transitions of copy sessions 140, such as the copy session 140-1 of FIG. 1. Five states are shown, i.e., a "Not-Running" State 310, an "Inactive" State 320, an "Active" State 330, a "Recover-Inactive" State 340, and a "Recover-Active" State 350. It should be appreciated that copy sessions 140 may have greater or fewer states than those shown and that state transitions may involve actions different from those shown. The particular example shown is intended to be illustrative rather than limiting.

At 312, the copy session 140-1 transitions from the Non-Running State 310 to the Inactive State 320. For example, transition 312 involves starting the copy session, e.g., by instantiating the copy session 140-1 in memory 130, and obtaining a new copy session identifier (SID) for the copy session. Transition 312 further involves persisting the new SID in DS-1, e.g., by creating a new record in DS-1 at an unused record position and writing the new SID to the new record. Transition 312 still further involves initializing memory-resident structures in the new copy session 140-1, such as those for managing core session properties in volatile memory space 142, and setting the copy state to "Inactive" in memory. Transition 312 further involves persisting those core session properties, including the "Inactive" state, in DS-2. For example, SP 120 creates a new record in DS-2 and writes the core session properties for the session 140-1 to the new record. In the manner described above, the new record created in DS-2 may have the same index as the new record created for the new SID in DS-1.

Once the copy session assumes the Inactive State 320, the copy session runs on the SP 120 and can respond to polling, e.g., from administrative program 118a. The copy session has direct access to core session properties (e.g., source, destination, etc.) from its memory space 142 and can therefore respond to polling requests without having to access disk. As no copy-progress data 230 has been loaded (e.g., into memory portion 144), the copy session can operate with a relatively small memory footprint.

At 322, the copy session 140-1 transitions from the Inactive State 320 to the Active State 330. Upon making this transition, the SP 120 sets the copy state to "Active," e.g., both in the volatile memory space 142 and in the CSP 226 of DS-2. Transition 322 further involves creating objects in the volatile memory portion 144 for maintaining copy progress data. If the Inactive State 320 from which the transition 322 was made had been entered from the Active State 330 (rather than from the Not-Running State 310), then the new session 140-1 reads previously persisted copy-progress data 230 from DS-3 into the memory portion 144. Otherwise, the new session 140-1 creates a new record in DS-3 for persisting copy-progress data 230, e.g., at the same record index used to store the new SID in DS-1 and the new core session properties in DS-2.

Once the copy session 140-1 assumes the Active State 330, the copy session 140-1 invokes copy engines CE1a and CE1b to begin copying, or to resume copying as the case may be. As copying proceeds, copy session 140-1 updates in-memory structures in memory portion 144 (e.g., counters 232, progress indicators 234, bitmaps 236) to reflect copying progress. Also, the copy session 140-1 may regularly flush the contents of memory portion 144 to the corresponding record in DS-3. It should be appreciated that copy session 140-1 typically has a much large memory footprint in the Active State 330 than it has in the Inactive State 320.

At 332, the copy session 140-1 transitions from the Active State 330 to the Inactive State 320. For example, the copy session 140-1 suspends copying and sets its copy state to "Inactive," e.g., both in volatile memory space 142 and in the persistent record in DS-2. The copy session 140-1 may again flush the contents of memory portion 144 to the corresponding record in DS-3. Also, the copy session 140-1 may free the memory portion 144, e.g., by destroying the software objects that held the copy-progress data, by setting pointers to null, etc.

The copy session 140-1 may repeatedly transition between the Inactive State 320 and the Active State 330, e.g., as the director 132 (FIG. 1) cycles through different groups of copy sessions 140. Eventually, the copy session 140-1 runs to completion, i.e., i.e., once all the data of S1 are copied to D1.

When copying is finished, the copy session 140-1 transitions from the Inactive State 320 to the Not-Running State 310. This transition 324 may involve clearing all records for copy session 140-1 from all three data structures, DS-1, DS-2, and DS-3, and making the records previously used by session 140-1 available to new sessions. Transition 324 may further involve removing the session 140-1 from memory 130, such that the entire memory footprint occupied by copy session 140-1 is freed.

The Recover-Inactive State 340 reflects a condition in which an inactive copy session (e.g., copy session 140-1) was prematurely terminated, e.g., due to a system crash or reboot. In this case, state transition 342 brings the inactive session back online. For example, SP 120 obtains the SID 210 of the interrupted copy session from a record in DS-1 and its corresponding set of core properties 220 from a corresponding record in DS-2. The core properties 220 include the copy-state indicator 226, which, in this case, indicates that the session was inactive when it was last running. SP 120 may restart the copy session and restore the core session properties to volatile memory space 142. As the copy session was inactive at the time it was interrupted, it is restored to the same, inactive state. Thus, it is no necessary to load copy-progress data into the recovered session. Once restarted, the recovered copy session can cycle between the Inactive State 320 and the Active State 330 in the manner described above.

Like the Recover-Inactive State 340, the Recover-Active State 350 also reflects a condition in which a copy session is prematurely terminated. In the case of the Recover-Active State 350, however, the copy session to be recovered was running in the Active State 330 when it was terminated. Here, transition 352 restores active operation, e.g., by performing those acts described above for transition 342 and also by restoring copy-progress data 230 from DS-3 into volatile memory portion 144. With both sets of data restored, the active copy session can be resumed, picking up approximately where it left off the last time it was running. Some copying of data may need to be repeated, however, as copy progress may have been terminated before the most recent progress was flushed to DS-3. Preferably, flushing 148 is performed at a sufficiently high frequency to avoid large amounts of duplicated copying in the event of recovery.

Figure 4:
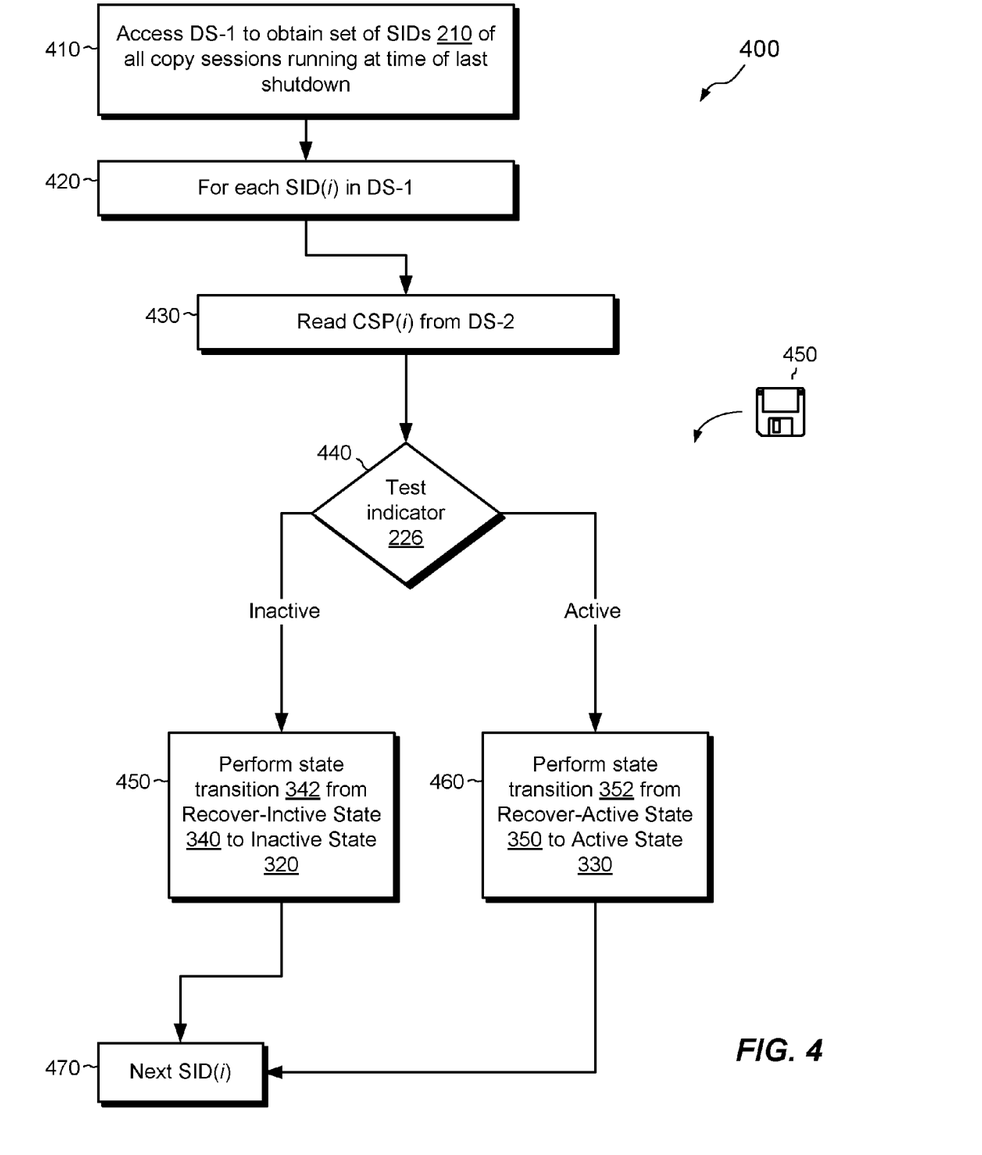
FIG. 4 is a flowchart showing an example method for restarting copy sessions following a reboot of a storage processor on which copy sessions may run.

In an example, copy sessions 140 may extend across SP reboots and, in the manner described above, may survive system panics. FIG. 4 shows an example method 400 for recovering copy sessions after a reboot of SP 120. The method 400 may be carried out, for example, by the SP 120, i.e., by the set of processors 124 executing instructions in the memory 130.

At 410, the SP 120 accesses data structure DS-1 to obtain a set of SIDs 210 listed therein. The SIDs 210 listed in DS-1 identify all copy sessions 140 that were running on SP 120 at the time SP 120 was last shutdown or otherwise stopped working. In an example, act 410 is performed during a reboot sequence of SP 120 or shortly thereafter.

At 420, SP 120 iterates through the list of SIDs 210 in DS-1. For each SID(i) on the list at record position i, SP 120 performs acts 430, 440, (450 or 460), and 470.

At 430, SP 120 reads core-session properties CSP(i) from DS-2, i.e., by reading the record in DS-2 at record position i. The core-session properties obtained from CSP(i) includes, among other things, the copy-state indicator 226, which provides the last-known state of the copy session SID(i), i.e., whether it was active or inactive. Decision 440 branches on the value of the copy-state indicator 226 obtained from DS-2. If the value of copy-state indicator 226 is inactive, operation proceeds to act 450.

At 450, SP 120 performs state transition 342 (FIG. 3) to convey the copy session from the Recover-Inactive State 340 to the Inactive State 320. In the manner described above, this transition 342 restarts the inactive copy session SID(i) and loads the core-session properties CSP(i) into volatile memory space 142 of the restarted copy session. The copy session may then resume operation in the Inactive State 320.

If the value of the copy-state indicator 226 at decision 440 is active, operation proceeds to act 460, which performs state transition 352 (FIG. 3), i.e., to convey the current copy session SID(i) from the Recover-Active State 350 to the Active State 330. As described above, this transition 352 restores active operation, e.g., by performing those acts described above for transition 342 and also by restoring copy-progress data. For example, transition 352 accesses DS-3 to obtain copy session data CPD(i) and proceeds to load the contents of CPD(i) into volatile memory portion 144 of the current copy session SID(i).

Upon completing either of acts 450 and 460, operation proceeds to act 470, which repeats the acts 430, 440, and 450 or 460 for the next SID listed in DS-1. Operation continues in this manner until all copy sessions listed in DS-1 have been restored.

Although FIG. 4 is seen to restore copy sessions sequentially, i.e., one after another, this is merely an example. For instance, SP 120 may alternatively restore such sessions in parallel, e.g., through the use of multiple threads or by other means.

Figure 5:
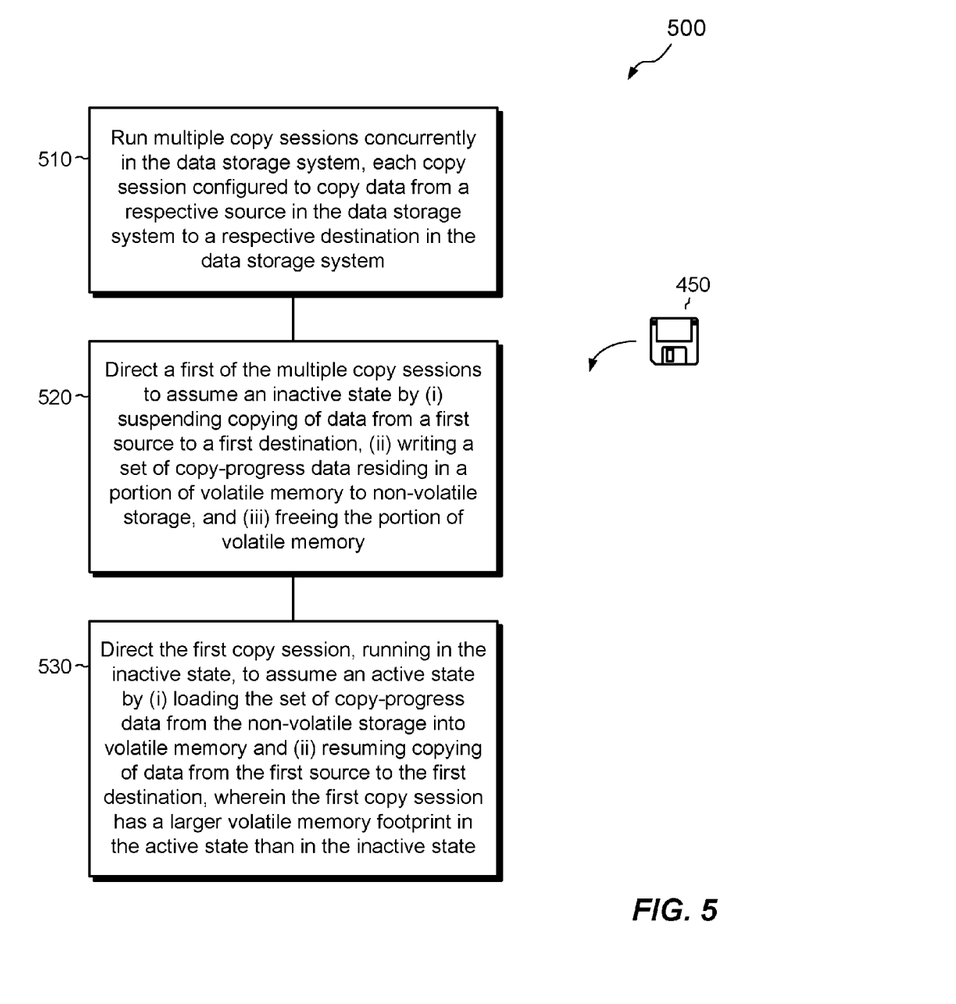
FIG. 5 is a flowchart showing an example method of managing copy sessions in a data storage system.

FIG. 5 shows an example method 500 that may be carried out in connection with the data storage system 116. The method 500 may be performed, for example, by the software constructs described in connection with FIGS. 1 and 2, which reside in the memory 130 of SP 120 and are run by the set of processing units 124. The various acts of the method 500 may be ordered in any suitable way. For example, embodiments may be constructed in which acts are performed in different orders from that illustrated, which may include performing some acts simultaneously.

At 510, multiple copy sessions 140 are run concurrently in the data storage system 116. Each copy session 140 is configured to copy data from a respective source (e.g., S1) in the data storage system 116 to a respective destination (e.g., D1) in the data storage system 116.

At 520, a first (e.g., 140-1) of the multiple copy sessions 140 is directed to assume an Inactive State 320 by (i) suspending copying of data from a first source S1 to a first destination D1, (ii) writing a set of copy-progress data residing in a portion of volatile memory 144 to non-volatile storage (e.g., to DS-3 in storage 180), and (iii) freeing the portion 144 of volatile memory.

At 530, the first copy session 140-1, which is running in the Inactive State 320, is directed to assume an Active State 330 by (i) loading the set of copy-progress data from the non-volatile storage (e.g., DS-3) into volatile memory and (ii) resuming copying of data from the first source S1 to the first destination D1. The first copy session 140-1 has a larger volatile memory footprint in the Active State 330 than in the Inactive State 320, e.g., on account of the fact that the first copy session 140-1 does not store copy-progress data when running in the Inactive State 320.

Having described certain embodiments, numerous alternative embodiments or variations can be made. For example, although embodiments have been described in which certain acts are performed by SP 120, such acts may alternatively be performed by SP 120a, or by both SP 120 and SP 120a working together.

Further, although the copying described herein is conducted between a source in the data storage system 116 and a destination in the data storage system 116, some embodiments do not require both the source and the destination to be in the same data storage system. Also, some or all of the storage 180 may be located remotely from SP 120, e.g., in a different room, building, or even online or in the cloud. Such remote storage is still considered to be part of the data storage system 116, provided that the SP 120 can access the storage devices backing both the source and the destination.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 450 in FIGS. 4 and 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing copy sessions in a data storage system, the method comprising:
    running multiple copy sessions concurrently in the data storage system, each copy session configured to copy data from a respective source in the data storage system to a respective destination in the data storage system;
    directing a first of the multiple copy sessions to assume an inactive state by (i) suspending copying of data from a first source to a first destination, (ii) writing a set of copy-progress data residing in a portion of volatile memory to non-volatile storage, and (iii) freeing the portion of volatile memory; and
    directing the first copy session, running in the inactive state, to assume an active state by (i) loading the set of copy-progress data from the non-volatile storage into volatile memory and (ii) resuming copying of data from the first source to the first destination,
    wherein the first copy session has a larger volatile memory footprint in the active state than in the inactive state,
    wherein the method further comprises providing multiple data structures in the non-volatile storage, the data structures storing information relating to the copy sessions running in the data storage system and including:
        a first data structure that stores a session ID (identifier) of each copy session running in the data storage system;
        a second data structure that stores a set of core properties for each session ID stored in the first data structure, each set of core properties including a copy-state indicator that indicates whether the respective copy session identified by that session ID is in the active state or the inactive state; and
        a third data structure that stores copy-progress data for each of a set of a set of copy sessions identified by a session ID stored in the first data structure,
    wherein the first data structure stores a session ID of the first copy session, wherein the second data structure stores a copy-state indicator of the first copy session, and wherein writing the set of copy-progress data to non-volatile storage for the first copy session is performed by writing that set of copy-progress data to the third data structure, and
    wherein the method further comprises, while the first copy session is operating in the active state:
        updating the set of copy-progress data in volatile memory to track progress of the first copy session in copying data from the first source to the first destination; and
        flushing the set of copy-progress data to the third data structure to persistently record progress of the first copy session in copying data from the first source to the first destination.

2. The method of claim 1, wherein each of the multiple copy sessions is configured to run in both the active state and the inactive state, and wherein the method further comprises:
    limiting a maximum number of copy sessions that run in the active state at any given time; and
    running all of the copy sessions in the active state at least some of the time.

3. The method of claim 1, wherein flushing the set of copy-progress data is performed repeatedly on a schedule that prevents the set of copy-progress data stored in the third data structure from falling behind the set of copy-progress data in the volatile memory by more than a predetermined limit.

4. The method of claim 1, wherein the first copy session runs on a storage processor in the data storage system, and wherein the method further comprises, after rebooting the storage processor:
    accessing the first data structure to obtain a set of session IDs stored in the first data structure, each session ID identifying a respective copy session that was running in the data storage system prior to the storage processor being rebooted; and
    for each session ID obtained from the first data structure, (i) restarting the respective copy session for that session ID on the storage processor, (ii) accessing a respective set of core properties from the second data structure, and (iii) configuring the restarted copy session with the respective set of core properties accessed from the second data structure.

5. The method of claim 4, wherein the method further comprises, after rebooting the storage processor and for each set of core properties accessed in the second data structure for which the respective copy-state indicator indicates the active state:
    accessing respective copy-progress data from the third data structure;
    loading the copy-progress data from the third data structure into volatile memory of the respective copy session; and
    resuming copying of data for the respective copy session from the respective source to the respective destination.

6. The method of claim 5, wherein the method further comprises, after rebooting the storage processor and for each set of core properties accessed in the second data structure for which the respective copy-state indicator indicates the inactive state, running the respective copy session in the inactive state without loading any copy-progress data from the third data structure.

7. A computer program product including a set of non-transitory, computer-readable media having instructions which, when executed by control circuitry of a data storage system, cause the control circuitry to perform a method for managing copy sessions in the data storage system, the method comprising:
    running multiple copy sessions concurrently in the data storage system, each copy session configured to copy data from a respective source in the data storage system to a respective destination in the data storage system;

directing a first of the multiple copy sessions to assume an inactive state by (i) suspending copying of data from a first source to a first destination, (ii) writing a set of copy-progress data residing in a portion of volatile memory to non-volatile storage, and (iii) freeing the portion of volatile memory; and directing the first copy session, running in the inactive state, to assume an active state by (i) loading the set of copy-progress data from the non-volatile storage into volatile memory and (ii) resuming copying of data from the first source to the first destination, wherein the first copy session has a larger volatile memory footprint in the active state than in the inactive state, wherein the method further comprises providing multiple data structures in the non-volatile storage, the data structures storing information relating to the copy sessions running in the data storage system and including:

a first data structure that stores a session ID (identifier) of each copy session running in the data storage system;

a second data structure that stores a set of core properties for each session ID stored in the first data structure, each set of core properties including a copy-state indicator that indicates whether the respective copy session identified by that session ID is in the active state or the inactive state; and a third data structure that stores copy-progress data for each of a set of a set of copy sessions identified by a session D stored in the first data structure, wherein the first data structure stores a session ID of the first copy session, wherein the second data structure stores a copy-state indicator of the first copy session, and wherein writing the set of copy-progress data to non-volatile storage for the first copy session is performed by writing that set of copy-progress data to the third data structure, and wherein the method further comprises, while the first copy session is operating in the active state:

updating the set of copy-progress data in volatile memory to track progress of the first copy session in copying data from the first source to the first destination; and flushing the set of copy-progress data to the third data structure to persistently record progress of the first copy session in copying data from the first source to the first destination.

8. The computer program product of claim 7, wherein each of the multiple copy sessions is configured to run in both the active state and the inactive state, and wherein the method further comprises:

limiting a maximum number of copy sessions that run in the active state at any given time; and running all of the copy sessions in the active state at least some of the time.

9. The computer program product of claim 7, wherein flushing the set of copy-progress data is performed repeatedly on a schedule that prevents the set of copy-progress data stored in the third data structure from falling behind the set of copy-progress data in the volatile memory by more than a predetermined limit.

10. The computer program product of claim 7, wherein the first copy session runs on a storage processor in the data storage system, and wherein the method further comprises, after rebooting the storage processor:

accessing the first data structure to obtain a set of session IDs stored in the first data structure, each session ID identifying a respective copy session that was running in the data storage system prior to the storage processor being rebooted; and for each session ID obtained from the first data structure, (i) restarting the respective copy session for that session ID on the storage processor, (ii) accessing a respective set of core properties from the second data structure, and (iii) configuring the restarted copy session with the respective set of core properties accessed from the second data structure.

11. The computer program product of claim 10, wherein the method further comprises, after rebooting the storage processor and for each set of core properties accessed in the second data structure for which the respective copy-state indicator indicates the active state:

accessing respective copy-progress data from the third data structure;

loading the copy-progress data from the third data structure into volatile memory of the respective copy session; and resuming copying of data for the respective copy session from the respective source to the respective destination.

12. The computer program product of claim 11, wherein the method further comprises, after rebooting the storage processor and for each set of core properties accessed in the second data structure for which the respective copy-state indicator indicates the inactive state, running the respective copy session in the inactive state without loading any copy-progress data from the third data structure.

13. A computer program product including a set of non-transitory, computer-readable media having instructions which, when executed by control circuitry of a data storage system, cause the control circuitry to perform a method for managing copy sessions in the data storage system, the method comprising:

running multiple copy sessions concurrently in the data storage system, each copy session configured to copy data from a respective source in the data storage system to a respective destination in the data storage system;

directing a first of the multiple copy sessions to assume an inactive state by (i) suspending copying of data from a first source to a first destination, (ii) writing a set of copy-progress data residing in a portion of volatile memory to non-volatile storage, and (iii) freeing the portion of volatile memory; and directing the first copy session, running in the inactive state, to assume an active state by (i) loading the set of copy-progress data from the non-volatile storage into volatile memory and (ii) resuming copying of data from the first source to the first destination, wherein the method further comprises providing multiple data structures in the non-volatile storage, the data structures including (i) a first data structure that stores a session ID (identifier) of each copy session running in the data storage system, including a session ID of the first copy session, (ii) a second data structure that stores a set of core properties for each session ID stored in the first data structure, each set of core properties including a copy-state indicator that indicates whether the respective copy session identified by that session ID is in the active state or the inactive state, the second data structure storing a copy-state indicator of the first copy session; and (iii) a third data structure that stores copy-progress data for each of a set of a set of copy sessions identified by a session ID stored in the first data structure, wherein writing the set of copy-progress data to non-volatile storage for the first copy session is performed by writing that set of copy-progress data to the third data structure, and wherein the method further comprises, while the first copy session is operating in the active state:
  updating the set of copy-progress data in volatile memory to track progress of the first copy session in copying data from the first source to the first destination; and
  flushing the set of copy-progress data to the third data structure to persistently record progress of the first copy session in copying data from the first source to the first destination.

14. The computer program product of claim 13, wherein flushing the set of copy-progress data is performed repeatedly on a schedule that prevents the set of copy-progress data stored in the third data structure from falling behind the set of copy-progress data in the volatile memory by more than a predetermined limit.

15. The computer program product of claim 13, wherein the first copy session runs on a storage processor in the data storage system, and wherein the method further comprises, after rebooting the storage processor:
  accessing the first data structure to obtain a set of session IDs stored in the first data structure, each session ID identifying a respective copy session that was running in the data storage system prior to the storage processor being rebooted; and
  for each session ID obtained from the first data structure, (i) restarting the respective copy session for that session ID on the storage processor, (ii) accessing a respective set of core properties from the second data structure, and (iii) configuring the restarted copy session with the respective set of core properties accessed from the second data structure.

16. The computer program product of claim 15, wherein the method further comprises, after rebooting the storage processor and for each set of core properties accessed in the second data structure for which the respective copy-state indicator indicates the active state:
  accessing respective copy-progress data from the third data structure;
  loading the copy-progress data from the third data structure into volatile memory of the respective copy session; and
  resuming copying of data for the respective copy session from the respective source to the respective destination.

17. The computer program product of claim 16, wherein the method further comprises, after rebooting the storage processor and for each set of core properties accessed in the second data structure for which the respective copy-state indicator indicates the inactive state, running the respective copy session in the inactive state without loading any copy-progress data from the third data structure.

* * * * *

UNITED STATES PATENT AND TRADEMARK OFFICE
CERTIFICATE OF CORRECTION

PATENT NO. : 9,933,953 B1
APPLICATION NO. : 15/198138
DATED : April 3, 2018
INVENTOR(S) : Alan L. Taylor et al.

Page 1 of 1

It is certified that error appears in the above-identified patent and that said Letters Patent is hereby corrected as shown below:

Column 13, Line 30, in Claim 7 change "D" to --ID--

Signed and Sealed this
Fifth Day of June, 2018

Andrei Iancu
*Director of the United States Patent and Trademark Office*